(12) United States Patent
Akiyoshi

(10) Patent No.: US 11,332,377 B2
(45) Date of Patent: May 17, 2022

(54) METHOD FOR PRODUCING POLYCRYSTALLINE SILICON PROCESSED ARTICLE

(71) Applicant: Tokuyama Corporation, Yamaguchi (JP)

(72) Inventor: Ayao Akiyoshi, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 393 days.

(21) Appl. No.: 16/488,960

(22) PCT Filed: Mar. 7, 2018

(86) PCT No.: PCT/JP2018/008827
§ 371 (c)(1),
(2) Date: Aug. 27, 2019

(87) PCT Pub. No.: WO2018/164197
PCT Pub. Date: Sep. 13, 2018

(65) Prior Publication Data
US 2020/0010327 A1   Jan. 9, 2020

(30) Foreign Application Priority Data
Mar. 8, 2017  (JP) .............................. JP2017-044202

(51) Int. Cl.
*C01B 33/035* (2006.01)
(52) U.S. Cl.
CPC ................................. *C01B 33/035* (2013.01)

(58) Field of Classification Search
CPC .................................................... C01B 33/035
See application file for complete search history.

(56) References Cited

U.S. PATENT DOCUMENTS

| 5,277,934 A | 1/1994 | Gilbert et al. |
| 10,077,192 B2 | 9/2018 | Faerber et al. |
| 10,301,181 B2 * | 5/2019 | Vietz .................... C01B 33/037 |

(Continued)

FOREIGN PATENT DOCUMENTS

| CN | 201598183 U | 10/2010 |
| EP | 0529593 A1 | 3/1993 |

(Continued)

OTHER PUBLICATIONS

English Abstract of JP 2011051837 A, Nov. 8, 2011.

(Continued)

*Primary Examiner* — Smita S Patel
(74) *Attorney, Agent, or Firm* — Cahn & Samuels, LLP

(57) ABSTRACT

A method for producing a polycrystalline silicon processed article includes removing a polycrystalline silicon rod, obtained by precipitating polycrystalline silicon on a silicon core wire held by a carbon member connected to an electrode in a reactor by the Siemens method, in a state in which the carbon member is included at the end portion thereof and processing the polycrystalline silicon rod. The polycrystalline silicon rod is detached from the electrode and the carbon member present on the end portion of the polycrystalline silicon rod is covered using a covering material until the processing, whereby the polycrystalline silicon rod and the carbon member are handled in a separated state.

8 Claims, 4 Drawing Sheets

(56) References Cited

U.S. PATENT DOCUMENTS

| | | |
|---|---|---|
| 10,377,636 B2 | 8/2019 | Miyao et al. |
| 2010/0040803 A1 | 2/2010 | Kim et al. |
| 2012/0175613 A1 | 7/2012 | Netsu et al. |
| 2012/0186300 A1* | 7/2012 | Ishizaki ............... C01B 33/035 65/33.3 |
| 2015/0003952 A1 | 1/2015 | Kurosawa et al. |
| 2017/0001868 A1 | 1/2017 | Faerber et al. |

FOREIGN PATENT DOCUMENTS

| | | |
|---|---|---|
| EP | 2479142 A1 | 7/2012 |
| JP | 2011051837 A | 11/2011 |
| JP | 2011063471 A | 2/2012 |
| JP | 2013159504 A | 8/2013 |
| JP | 2015229604 A | 12/2015 |
| JP | 2017503747 A | 2/2017 |
| WO | 2016074939 A1 | 5/2016 |

OTHER PUBLICATIONS

English Abstract of JP 2011063471 A, Feb. 2, 2012.
English Abstract of JP 2013159504 A, Aug. 19, 2013.
Abstract of JP 2017503747 A, Feb. 2, 2017.
English Abstact of JP 2015229604 A, Dec. 21, 2015.
English Abstract for CN201598183U, Oct. 6, 2010.
Machine translation of CN 201598183U, Oct. 6, 2010.
European Patent Office Extended Search Report, Mar. 9, 2020.
English Abstract of WO2016074939A1, May 19, 2016.
Search Report and Written Opinion, Intellectual Property Office of Singapore, Oct. 2020.
English Translation of International Preliminary Report on Patentability, International App. No. PCT/JP2018/008827, dated Sep. 19, 2019.

* cited by examiner

METHOD FOR PRODUCING POLYCRYSTALLINE SILICON PROCESSED ARTICLE

This application is a U.S. national stage application of PCT/JP2018/008827 filed on 7 Mar. 2018 and claims priority to Japanese patent document 2017-044202 filed on 8 Mar. 2017, the entireties of which are incorporated herein by reference.

TECHNICAL FIELD

The present invention relates to a novel method for producing a polycrystalline silicon processed article. Specifically, the present invention provides the novel method for producing the polycrystalline silicon processed article including a step of preventing a carbon contamination of a surface of a polycrystalline silicon rod caused by a carbon member which is provided at an end of the polycrystalline silicon rod when handling the polycrystalline silicon rod obtained by Siemens method.

BACKGROUND OF THE INVENTION

A polycrystalline silicon used as a raw material of a semiconductor or a solar battery wafer is obtained as a polycrystalline silicon rod 5 usually by Siemens method in which a silicon core wire 2 having inverted U shape, which becomes a seed rod, is held by a carbon member 4 connected to an electrode 3 in a reactor 1 as shown in FIG. 1 and a polycrystalline silicon is deposited to a surface of the silicon core wire. Then, the polycrystalline silicon rod is detached from the electrode while having the carbon member at the end of the polycrystalline silicon rod, and for example as shown in FIG. 2, several rods are all carried to a processing room using a push cart 6, then the carbon member is separated. Then, if needed, the polycrystalline silicon rod is crushed into appropriate size or contamination on the surface of the polycrystalline silicon are washed, thereby a processed article such as a nugget, a cut rod, and the like is produced.

Recently, cleanness of the polycrystalline silicon surface is even more demanded. In view of such circumstances, the present inventors have carried out keen study to understand which procedure in the production of the polycrystalline silicon processed article causes contamination of the polycrystalline silicon. As a result, it was found that the carbon member was a major cause of contamination when the polycrystalline silicon rod is taken out from the reactor or when it is carried by the push cart. For example, the present inventors have found that carbon contamination occurs when the carbon member directly contacts the surface of neighboring polycrystalline silicon rod or when part of the carbon member breaks and falls off as the carbon member contacts various other members and causing fragment of carbon to fall off and contact the surface of the polycrystalline silicon rod which causes carbon to adhere.

On the other hand, as a method of reducing a contamination level of fluorine component, metal, and the like on the polycrystalline silicon surface, a method is proposed in which a plastic bag is covered over the polycrystalline silicon rod immediately after the polycrystalline silicon rod is formed in the reactor by Siemens method, then the polycrystalline silicon rod is taken out from the reactor while the cover is covered over the polycrystalline silicon rod, followed by carrying it to a clean room while sealing a lower part of the polycrystalline silicon rod so that it does not come out from the plastic bag, and then the polycrystalline silicon rod is crushed in the clean room to make a product (see Patent Document 1). By doing so, the polycrystalline silicon rod can be avoided from directly contacting various members when the polycrystalline silicon rod is taken out from the reactor or when it is carried by a push cart and the like, as a result the surface cleanness of the polycrystalline silicon rod can be maintained.

However, when the polycrystalline silicon rod is sealed while the carbon member is at the end of the polycrystalline silicon rod as in case of the above method, obviously the carbon member is also placed inside the plastic bag. By carrying the polycrystalline silicon rod in such state using the push cart, a fragment of the carbon member which fell off contacts the surface of the polycrystalline silicon rod while inside the plastic bag, and there is a possibility of carbon contamination taking place. Also, the polycrystalline silicon rod may be placed inside the plastic bag after the carbon member at the end of the polycrystalline silicon rod is removed while inside the reactor, however part of carbon scatters when the carbon member is removed, thus the reactor and the polycrystalline silicon rod may be contaminated.

[Patent document 1] JP Patent Application Publication No. 2015-229604

BRIEF SUMMARY OF THE INVENTION

Therefore, the object of the present invention is to provide a novel method for producing a polycrystalline silicon processed article including a step of preventing a carbon contamination on a surface of a polycrystalline silicon rod caused by a carbon member at an end of the polycrystalline silicon rod while handling the polycrystalline silicon rod obtained by Siemens method.

The present inventors have carried out keen examination to attain the above object. As a result, the present inventors have found that the above object can be attained by covering a carbon member at an end of the polycrystalline silicon rod using a covering member.

That is, the present invention is a method for producing a polycrystalline silicon processed article including steps of depositing a polycrystalline silicon by Siemens method to a silicon core wire held by a carbon member connected to an electrode in a reactor to obtain a polycrystalline silicon rod, detaching the polycrystalline silicon rod from the electrode while having the carbon rod at an end of the polycrystalline silicon rod, and processing the polycrystalline silicon rod, wherein the carbon member at the end of the polycrystalline silicon rod is covered by a covering member after the polycrystalline silicon rod is detached from the electrode until being processed to handle the polysilicon rod and the carbon member in a separate condition.

Also, in the present invention, a lower part of the polycrystalline silicon rod is preferably covered by the covering member together with the carbon member. Here, an area 200 mm or less from the end of the polycrystalline silicon rod is preferably covered.

Further, the lower part of the polycrystalline silicon rod is covered by the covering member together with the carbon member and also an upper part or entire polycrystalline silicon rod is covered by other covering member.

Also, the method for producing the polycrystalline silicon processed article includes a step of removing the carbon member from the polycrystalline silicon rod, and when doing so, the carbon member is preferably removed while the carbon member is covered by the covering member.

The covering member is preferably a resin covering member, and more preferably polyethylene film or bag.

The polycrystalline silicon processed article of the present invention is obtained by the above mentioned method, and preferably it is a polycrystalline silicon fragment article which is called a chunk, a nugget, a chip, and the like.

The method of production of the present invention includes a step of handling the polycrystalline silicon rod and the carbon member in a separate condition by covering the carbon member by the covering member. Thereby, carbon contamination of the polycrystalline silicon rod surface caused by the carbon member can be effectively avoided; specifically, a carbon contamination caused by the carbon member at the end of the polycrystalline silicon rod directly contacting neighboring polycrystalline silicon rods when taking out the polycrystalline silicon rod from the reactor or when carrying it with a push cart can be avoided; or a carbon contamination caused by a fragment of the carbon member contacting the polycrystalline silicon rod on the push cart when part of the carbon member breaks and fall off while carrying with the push cart can be avoided. As a result, a highly clean polycrystalline silicon processed article can be obtained stably.

DETAILED DESCRIPTION OF THE INVENTION

Hereinafter, an embodiment of the present invention is described in detail. First, terms used in the present specification are explained in below.

Figure 1:
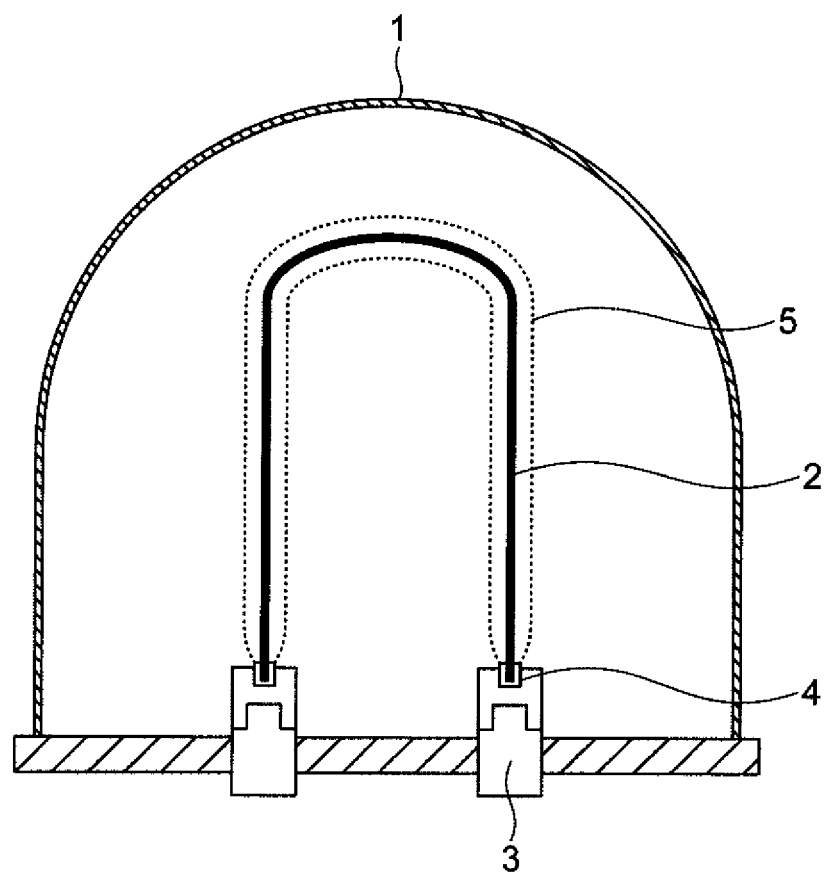
FIG. 1 is a schematic diagram of a reactor according to Siemens method.
Figure 2:
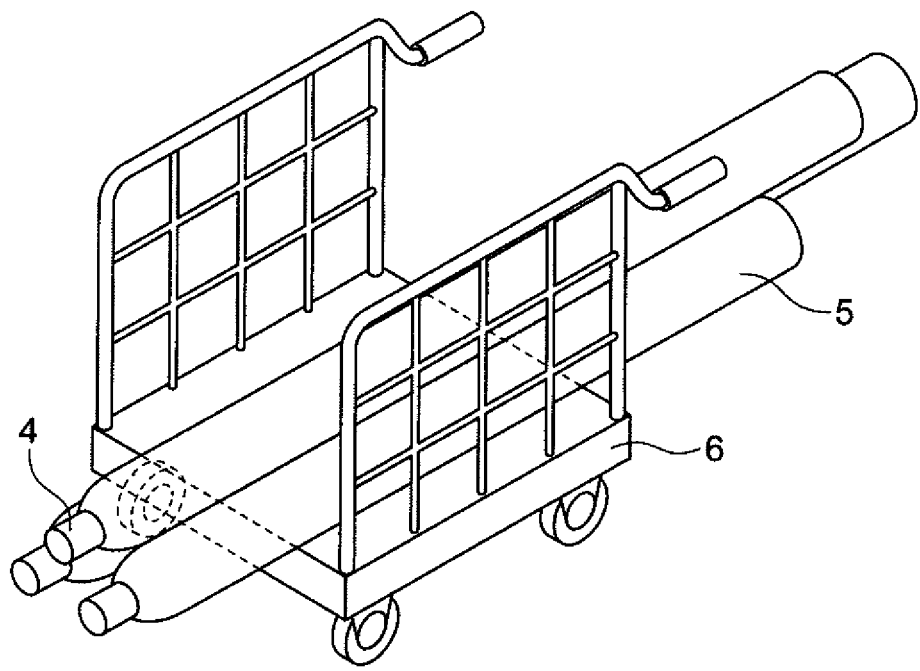
FIG. 2 is a schematic diagram of a polycrystalline silicon rod placed on a push cart.

A polycrystalline silicon rod is a columnar shape object of polycrystalline silicon obtained by using Siemens reactor as shown in FIG. 1 and it is made of the polycrystalline silicon deposited to a surface of a silicon core wire. According to Siemens method, a polycrystalline silicon rod is obtained as inverted U shape, but the polycrystalline silicon rod according to the present invention may be L shape of which a part of inverted U shape is lost, or it may be a rod shape.

Also, an end of the polycrystalline silicon rod is a part which contacts with an upper end part of the carbon member. This end part and nearby area of the end part may be referred as "a lower part" of the polycrystalline silicon rod.

An upper part of the polycrystalline silicon rod refers to a part besides the lower part, and it corresponds to a part away from the carbon member.

Also, the polycrystalline silicon rod and the carbon member at the end of the polycrystalline silicon rod may be together referred as "entire body".

Figure 3A:
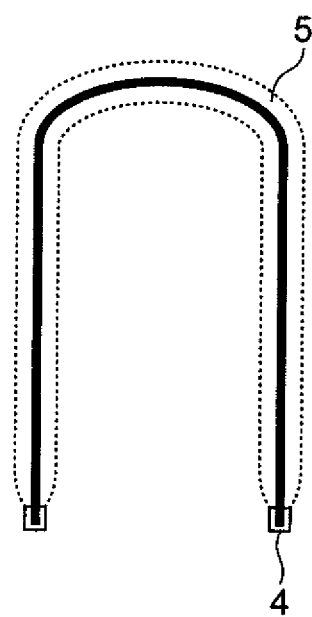
FIGS. 3(a)-(c) are schematic diagrams of the polycrystalline silicon rod immediately after being detached while still in the reactor. The detached polycrystalline silicon rod may be an inverted U shape object FIG. 3(a); an inverted L shape object (FIG. 3(b)); or be rod-shaped (FIG. 3(c)).
Figure 3B:
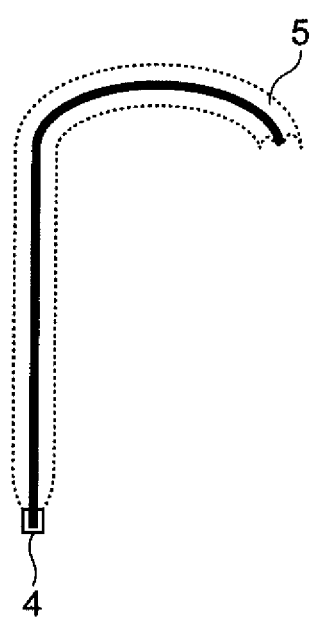
Figure 3C:

In the production method of the polycrystalline silicon process article of the present invention, as mentioned in above, the polycrystalline silicon rod obtained by Siemens method is obtained by depositing the polycrystalline silicon to the surface of the silicon core wire held by the carbon member. At this time, the polycrystalline silicon is not only deposited to the surface of the silicon core wire but also part of the polycrystalline silicon is deposited on the surface of the carbon member, thereby the carbon member and the polycrystalline silicon rod forms one body. Therefore, after deposition reaction, the polycrystalline silicon rod is detached from the electrode in the reactor while having the carbon member at the end of the polycrystalline silicon rod. The detached polycrystalline silicon rod is inverted U shape object (FIG. 3(a)); or it may be inverted L shape object (FIG. 3(b)) is formed by breaking a part which corresponds to an upper both ends of the silicon wire originally having inverted U shape breaks. Furthermore, the detached polycrystalline silicon rod may be a rod shaped object (FIG. 3(c)).

The most characteristic feature of the present invention is that the present invention includes the step of handling the polycrystalline silicon rod and the carbon member in a separate condition by covering the carbon member by the covering member after the polycrystalline silicon rod is detached from the electrode and until it is processed.

In the production method of the polycrystalline silicon processed article of the present invention, "after the polycrystalline silicon rod is detached from the electrode and until it is processed" means immediately after the polycrystalline silicon rod is detached from the electrode in the reactor while having the carbon member at the end of the polycrystalline silicon rod and until the carbon member is removed from the polycrystalline silicon rod so that the polycrystalline silicon rod and the carbon member does not contact each other. In order to sufficiently exhibit the effect of the present invention, it is preferable to cover the carbon member as soon as possible, which causes carbon contamination of the surface of the polycrystalline silicon rod, to avoid carbon contamination as much as possible. Therefore, as a point of time to cover the carbon member, when the polycrystalline silicon rod is detached from the electrode in the reactor, when the polycrystalline silicon rod is taken out of the reactor, while the polycrystalline silicon rod is being transferred to the push cart, and when the polycrystalline silicon rod is placed on the push cart may be mentioned. Among these, the covering member is most preferably covered over the carbon member when the polycrystalline silicon rod is detached from the electrode in the reactor.

Figure 4A:
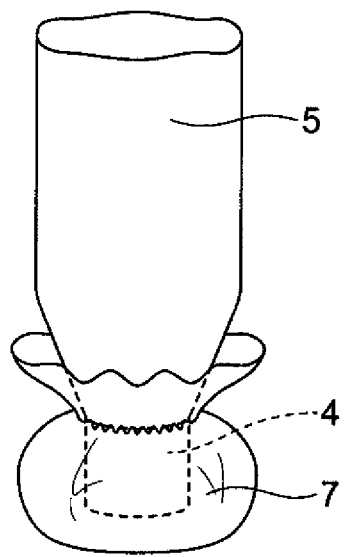
FIGS. 4(a)-(b) are schematic diagrams of the polycrystalline silicon rod when the carbon member is covered by the covering member. An embodiment includes only covering the carbon member (FIG. 4(a)) and another embodiment includes also covering part of the lower part of the polycrystalline silicon rod where the carbon exists (FIG. 4(b)).

In the production method of the polycrystalline silicon processed article of the present invention, as an embodiment of covering the carbon member at the end of the polycrystalline silicon rod by the covering member, all kinds of embodiments in which the polycrystalline silicon rod and the carbon member are in separate condition are included. Here, "separate condition" refers to a condition that the surface of a polycrystalline silicon rod and a carbon member at an end of other polycrystalline silicon rod does not directly contact. For example, an embodiment of covering at least the entire surface of the carbon member and also covering the surface of the polycrystalline silicon rod so that the fragment of broken carbon member does not contact the surface of the polycrystalline silicon rod is included. Therefore, as an embodiment of covering the carbon member by the covering member includes an embodiment of only covering the carbon member (FIG. 4(a)) and an embodiment of covering the carbon member while also covering part of the lower part of the polycrystalline silicon rod where the carbon exists (FIG. 4(b)).

A material of the covering member is not particularly limited, and it may be a resin, a fabric, or a paper. Preferably, the covering member made of resin is used because it is a low contaminant, and also it is resilient and easy to handle. Hereinafter, an example of using a resin covering member is described, but a fabric or paper covering member may be used instead of the resin covering member. As specific embodiment of covering the carbon member using the resin covering member, (1) an embodiment of covering the carbon member using a resin film or a resin bag, (2) an embodiment of placing a resin cap over the carbon member, (3) an embodiment of forming a coating film on the surface of the carbon member by immersing the carbon member in a resin solution, and the like may be mentioned.

Among these, regarding the embodiment (1), for example an embodiment in which the end of the polycrystalline silicon rod having the carbon member is placed at a center of the resin film having approximate square shape and pulling up opposing ends of the resin film to cover the carbon member; an embodiment of placing a bag made of resin film from the end of the polycrystalline silicon rod, and the like may be mentioned. Here, the resin film may be covered so that the resin film closely contacts the carbon member or the resin film and the carbon member may have space between each other. Note that, in case opening exists between the resin film and the carbon member, a fragment of the broken carbon member may fall out from the opening, thus the resin covering member is preferably fixed to the carbon member from outside using a string, a belt, an adhesive tape, and the like to block the opening. Furthermore, an embodiment of covering the carbon member by wrapping the ribbon form covering member around the carbon member may be mentioned.

In any of above methods, the resin film is not particularly limited as long as it has mechanical property so that it does not break while taking out or carrying, and for example a polyethylene film or bag having a thickness of 100 to 1000 μm and the like may be mentioned.

Also, the resin cap mentioned in above (2) is for example made of a material having elasticity like a rubber, and the resin cap is a molded article which is molded according to the shape of the end of the polycrystalline silicon rod where the carbon member exists, and one end of the resin cap is closed and other end is opened.

When using the resin film, bag, and cap as the covering member, preferably inside (a surface which contacts the carbon member) and outside of the covering member is cleansed in advance. The cleansing is preferably done by acid cleansing. By performing acid cleansing, contamination derived from the covering member can be reduced.

Further, as the resin solution mentioned in above (3), a solution in which a rubber material selected from the group consisting of urethane rubber, latex rubber, butadiene resin, polyvinyl alcohol, fluid butyl rubber, fluid rubber, natural rubber, nitrile rubber, chloroprene rubber, vinyl acetate rubber, and the like dissolved in an organic solvent selected from the group consisting of tetrahydrofuran, acetonitrile, trichloroethane, trichloroethylene, methylenechloride, toluene, xylene, and the like may be mentioned.

Figure 4B:
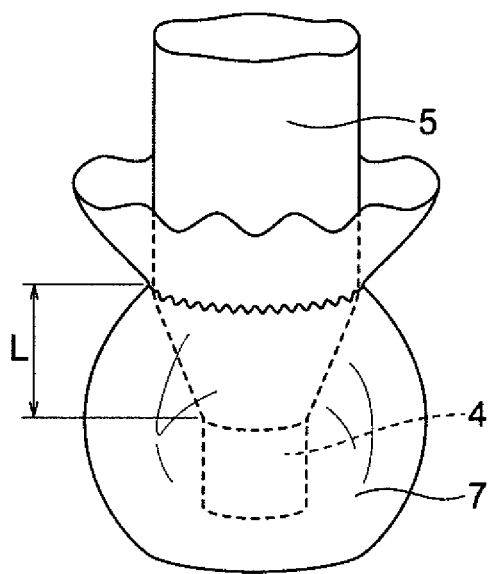

When the carbon member is covered while including part of the lower part of the polycrystalline silicon rod which is the side having the carbon member (see FIG. 4(b)), as shown in the figure, a length L which is a covering area of the rod is preferably 200 mm or less from the end of the polycrystalline silicon rod and more preferably 100 mm or less. In the area covered by the covering member, fragment of the carbon member is formed inside the covered area and carbon contamination of the rod tends to easily occur. Therefore, by making the length L of the covering area small, a yield of the polycrystalline silicon rod with little carbon contamination can be increased. Note that, if the carbon contamination is not an issue in case of using the polycrystalline silicon rod, then the area of the rod covered by the covering member can also be used.

Also, the embodiment of covering using the covering member is not limited to these embodiments, and in order to avoid the polycrystalline silicon rod from directly contacting to various members and the like, the lower part of the polycrystalline silicon rod is covered by the covering member together with the carbon member, and also the upper part of the polycrystalline silicon rod or the entire body may be covered by other covering member. For example, an embodiment of using the bag made by the resin film to cover the end of the polycrystalline silicon rod which is the side having the carbon member and also using other resin bag to cover the upper part of the polycrystalline silicon rod or the entire body which includes the carbon member and the polycrystalline silicon rod may be mentioned.

The method of processing according to the present invention preferably includes the step of removing the carbon member while the covering member is covered over the carbon member. According to the preferable method of production of the polycrystalline silicon rod of the present invention, as mentioned in above, the polycrystalline silicon rods of which each carbon member is covered by the covering member are carried to a processing room using a push cart and the like, then the carbon member is removed. The carbon member is removed by cutting off the lower end part of the rod or by knocking off the carbon member by a high-hardness tool such as a hammer and the like. Here, preferably the polycrystalline silicon rod of which the carbon member is covered by the covering member is carried to the processing room and while the covering member is still covered over the carbon member, the carbon member is preferably removed. Preferably, the carbon member is removed while the entire carbon member is covered by the covering member. Further, preferably the carbon member is removed while the lower part of the polycrystalline silicon rod is covered by the covering member and also the entire carbon member is covered by the covering member. By doing so, the fragment of the carbon member which is formed by an impact of cutting off the carbon member, an impact when the carbon member is cut off and falls off to a floor, and the like; which then causes the fragment to scatter can be prevented in advance. Therefore, for example a secondary contamination of the surface of the polycrystalline silicon rod can be prevented which is caused by the fragment scattering all of the room.

Then, once the carbon member is removed from the polycrystalline silicon rod and made sure that the carbon member and the polycrystalline silicon rod do not contact each other, the covering member may be removed from the carbon member if needed.

As such, according to the method of the present invention, carbon contamination of the surface of the polycrystalline silicon rod by the carbon member can be effectively avoided, and as a result highly clean polycrystalline silicon processed article can be obtained stably.

As the polycrystalline silicon processed article, a polycrystalline silicon fragment and the like obtained by crushing the polycrystalline silicon rod may be mentioned. This fragment is referred as a chunk, a nugget, a chip, and the like depending on the size. Also, it may be a cut rod which is obtained by cutting the polycrystalline silicon rod into a columnar shape.

DESCRIPTION OF THE REFERENCE NUMERAL

1 . . . Reactor
2 . . . Silicon core wire
3 . . . Electrode
4 . . . Carbon member
5 . . . Polycrystalline silicon rod
6 . . . Push cart
7 . . . Covering member

What is claimed is:

1. A method for producing a polycrystalline silicon processed article comprising:
    depositing a polycrystalline silicon by Siemens method to a silicon core wire held by a carbon member connected to an electrode in a reactor to obtain a polycrystalline silicon rod,
    detaching the polycrystalline silicon rod from the electrode while having the carbon member at an end of the polycrystalline silicon rod, removing the carbon member from the polycrystalline silicon rod while the carbon member is covered by a covering member, and processing the polycrystalline silicon rod,
    wherein the carbon member at the end of the polycrystalline silicon rod is covered by the covering member after the polycrystalline silicon rod is detached from the electrode until being processed to handle the polycrystalline silicon rod and the carbon member in a separate condition.

2. The method for producing the polycrystalline silicon processed article according to claim 1, wherein a lower part of the polycrystalline silicon rod is covered by the covering member together with the carbon member.

3. The method for producing the polycrystalline silicon processed article according to claim 1, wherein an area 200 mm or less from the end of the polycrystalline silicon rod is covered when a lower part of the polycrystalline silicon rod is covered by the covering member together with the carbon member.

4. The method for producing the polycrystalline silicon processed article according to claim 1, wherein a lower part of the polycrystalline silicon rod is covered by the covering member together with the carbon member and also an upper part or entire polycrystalline silicon rod is covered by other covering member.

5. The method for producing the polycrystalline silicon processed article according to claim 1, wherein the covering member is a resin covering member.

6. The method for producing the polycrystalline silicon processed article according to claim 5, wherein the resin covering member is a polyethylene film or bag.

7. The method for producing the polycrystalline silicon processed article according to claim 1, wherein the covering member is a fabric covering member.

8. The method for producing the polycrystalline silicon processed article according to claim 1, wherein the covering member is a paper covering member.

* * * * *